(12) United States Patent  (10) Patent No.: US 8,506,141 B2
Cannon et al.  (45) Date of Patent: Aug. 13, 2013

(54) TRIM MEANS FOR A MOTOR VEHICLE HAVING INTEGRATED LIGHTING SYSTEM

(75) Inventors: Carter Scott Cannon, Munich (DE);
Michael Behnke, Vaterstetten (DE);
Daniel Christochowitz, Leonberg (DE);
Christian Mauritz, Leinefelden (DE);
Carsten Müller, Steinheim (DE)

(73) Assignee: International Automotive Components Group GmbH, Krefeld (DE)

( * ) Notice: Subject to any disclaimer, the term of this patent is extended or adjusted under 35 U.S.C. 154(b) by 192 days.

(21) Appl. No.: 13/195,713

(22) Filed: Aug. 1, 2011

(65) Prior Publication Data

US 2012/0063154 A1 Mar. 15, 2012

(30) Foreign Application Priority Data

Aug. 2, 2010 (DE) .......... 10 2010 036 795

(51) Int. Cl.
*F21V 33/00* (2006.01)
(52) U.S. Cl.
USPC ........................................... 362/490
(58) Field of Classification Search
USPC ................................. 362/490, 488
See application file for complete search history.

(56) References Cited

U.S. PATENT DOCUMENTS

| | | | |
|---|---|---|---|
| 6,464,381 B2 | 10/2002 | Anderson, Jr. et al. | |
| 6,773,129 B2 | 8/2004 | Anderson, Jr. et al. | |
| 7,150,550 B2 | 12/2006 | Bogdan et al. | |
| 7,287,885 B2 | 10/2007 | Radu et al. | |
| 7,441,931 B2 | 10/2008 | Bayersdorfer et al. | |
| 8,016,465 B2 | 9/2011 | Egerer et al. | |
| 2003/0072166 A1* | 4/2003 | Sinzawa et al. | 362/488 |
| 2005/0007759 A1 | 1/2005 | Parker | |

(Continued)

FOREIGN PATENT DOCUMENTS

| | | |
|---|---|---|
| DE | 10260831 B3 | 4/2004 |
| DE | 102005005682 A1 | 8/2006 |

(Continued)

OTHER PUBLICATIONS

European Search Report issued in related European Patent Application No. 11174840.6; date mailed Nov. 23, 2011 (10 pages).

*Primary Examiner* — Laura Tso
(74) *Attorney, Agent, or Firm* — Grossman, Tucker, Perreault & Pfleger, PLLC

(57) ABSTRACT

A trim means for a motor vehicle comprises a carrier having a B side and a C side. A recess is formed into the B side of the carrier, and the carrier has an aperture in the region at the edge of the recess. A planar lighting unit comes to lie flush in the recess on the B side of the carrier, so that on the B side of the carrier a substantially continuous planar surface of the carrier with the lighting unit is produced. The lighting unit has a connection cable which is guided through the aperture to the C side of the carrier, where it is connected with a plug connector, a further conductor or directly with a control unit. A cover layer is applied onto the B side of the carrier and covers the planar lighting unit and at least a portion of the surface of the carrier. The cover layer forms the visible side of the trim means and is permeable to the light emitted from the lighting unit.

17 Claims, 15 Drawing Sheets

(56) References Cited

U.S. PATENT DOCUMENTS

| | | |
|---|---|---|
| 2007/0047246 A1* | 3/2007 | Barowski et al. .............. 362/488 |
| 2008/0074895 A1 | 3/2008 | Halbweiss et al. |
| 2009/0073708 A1* | 3/2009 | Kino et al. .................... 362/490 |
| 2010/0214795 A1 | 8/2010 | Salter et al. |

FOREIGN PATENT DOCUMENTS

| | | |
|---|---|---|
| DE | 102006012606 A1 | 11/2007 |
| DE | 102006044911 A1 | 3/2008 |
| DE | 102009039556 A1 | 3/2010 |
| EP | 0979760 A1 | 2/2000 |
| EP | 1418090 A1 | 5/2004 |
| EP | 2060444 B1 | 11/2009 |
| WO | 0194155 A1 | 12/2001 |
| WO | 02/061380 A2 | 8/2002 |

* cited by examiner

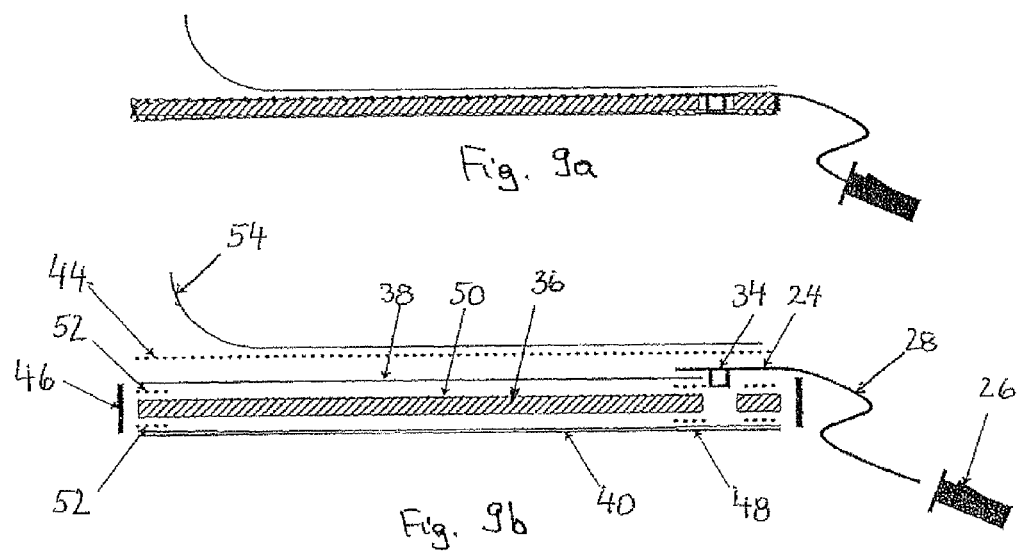
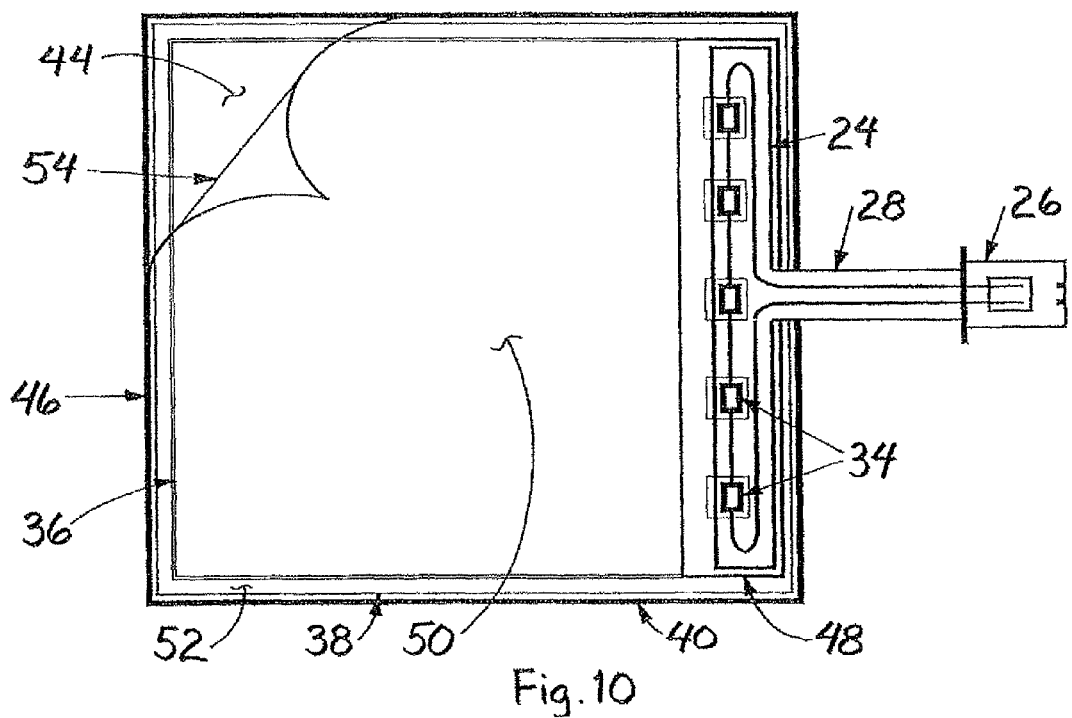

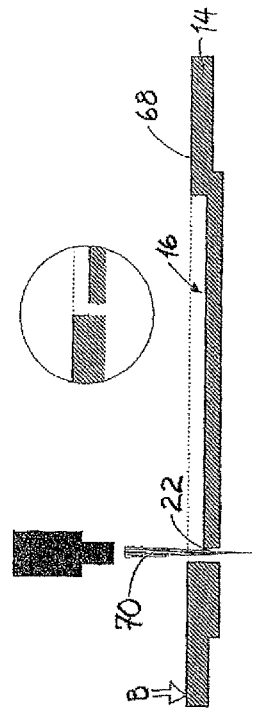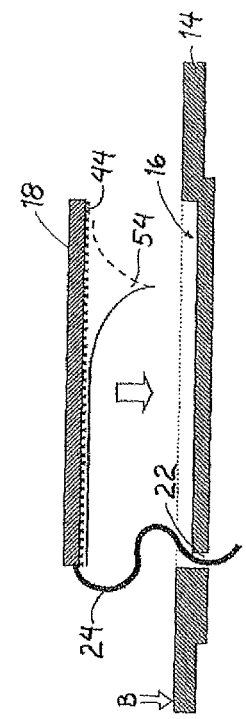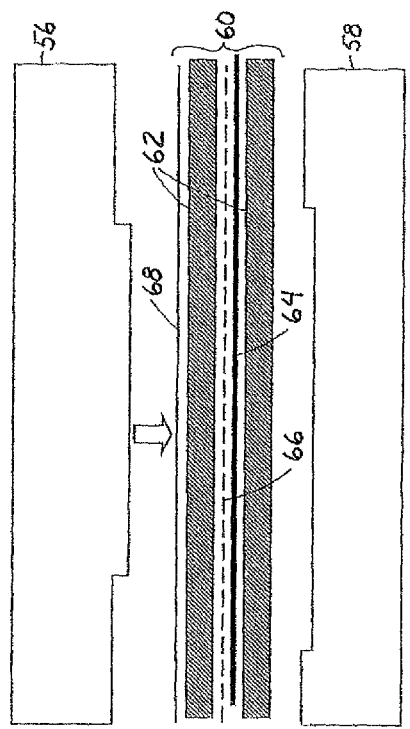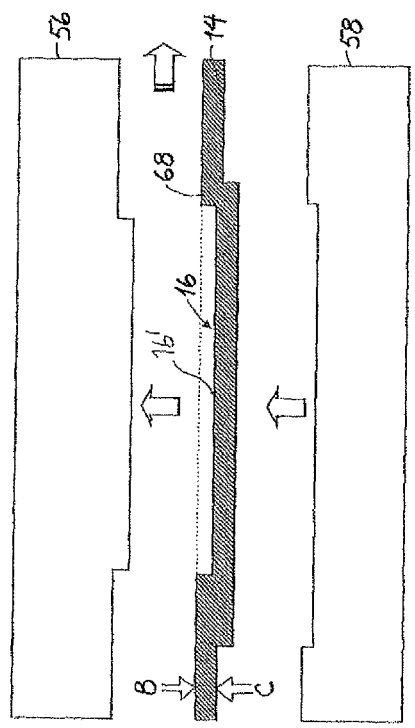

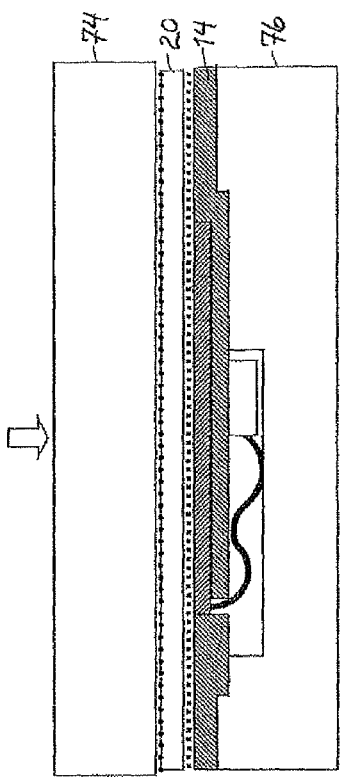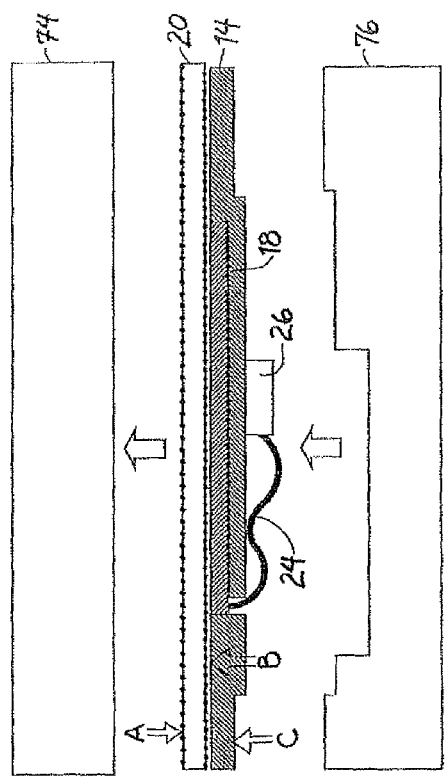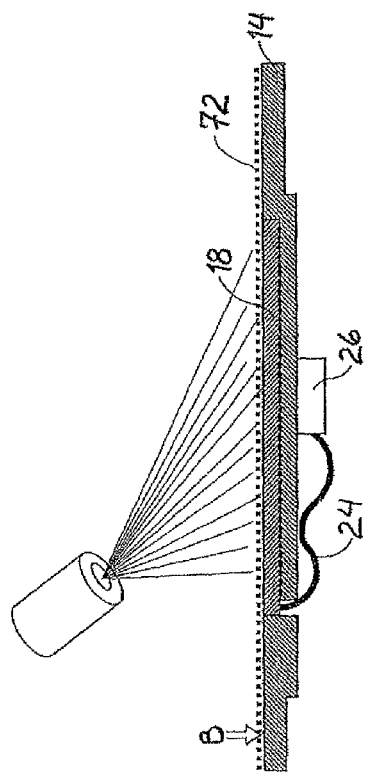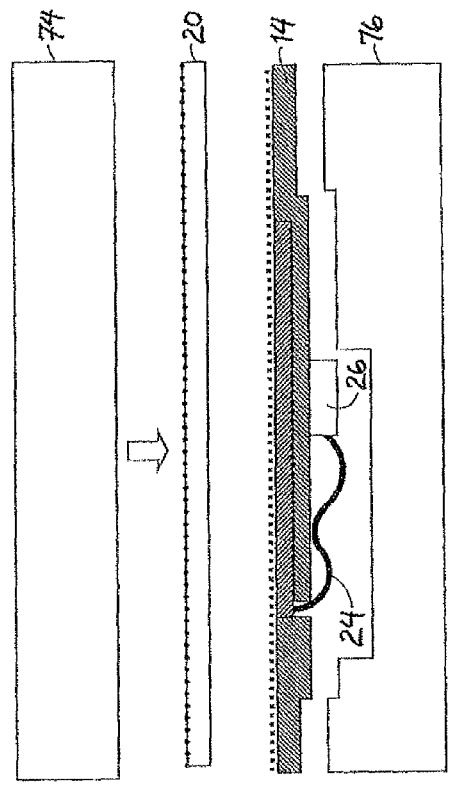
Fig. 19
Fig. 20
Fig. 21
Fig. 22

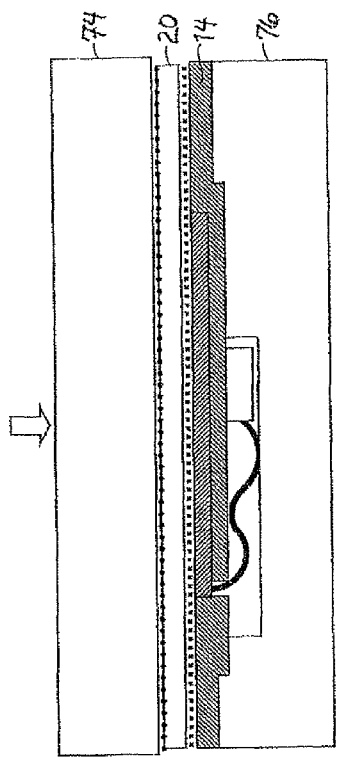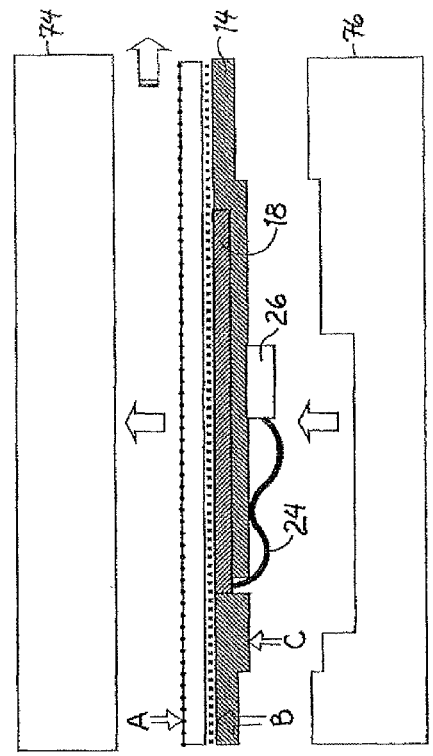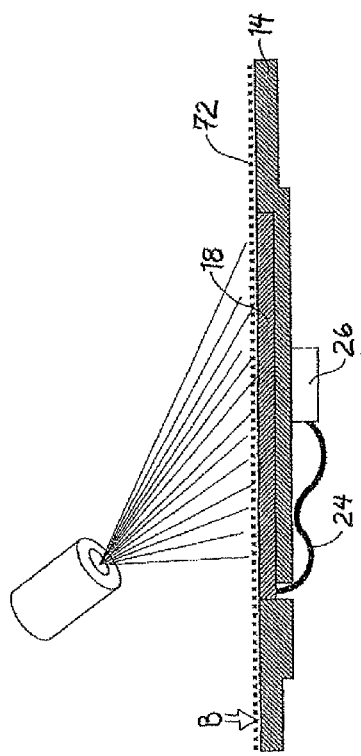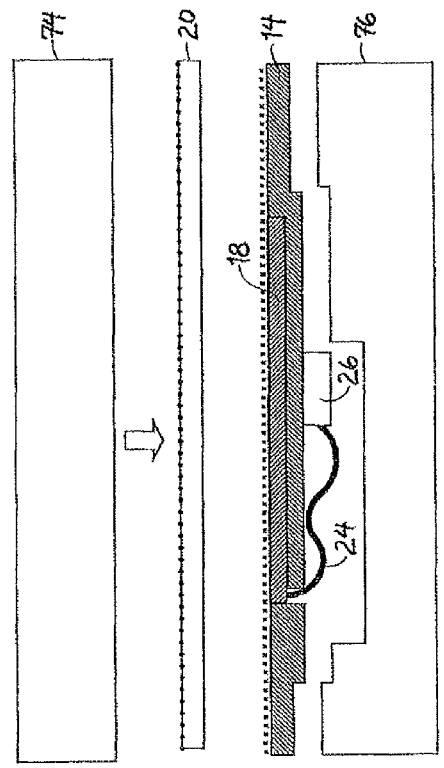

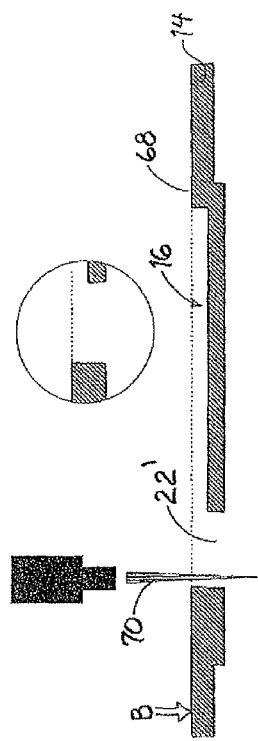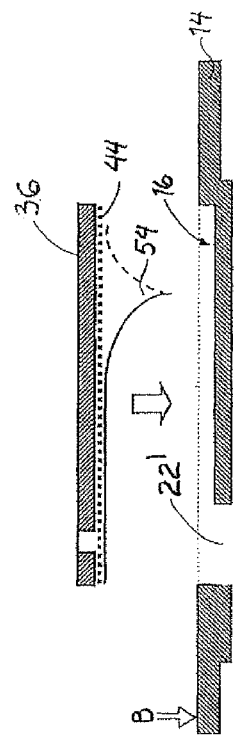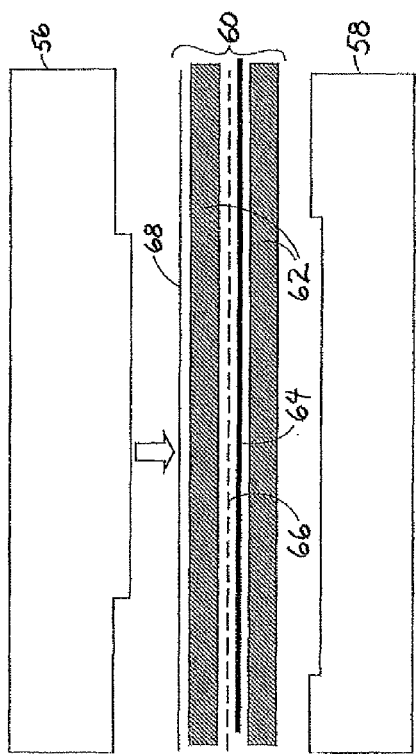

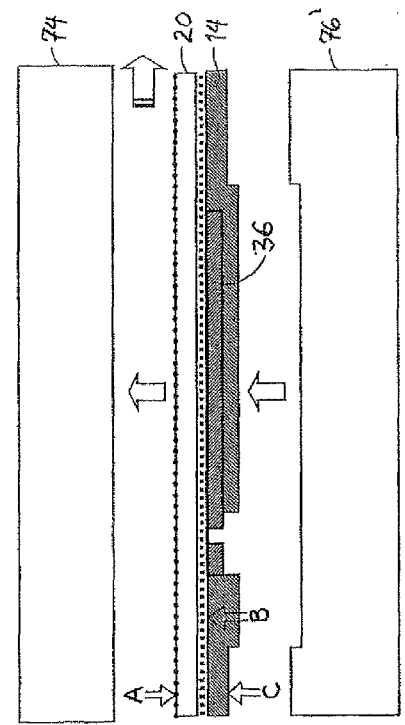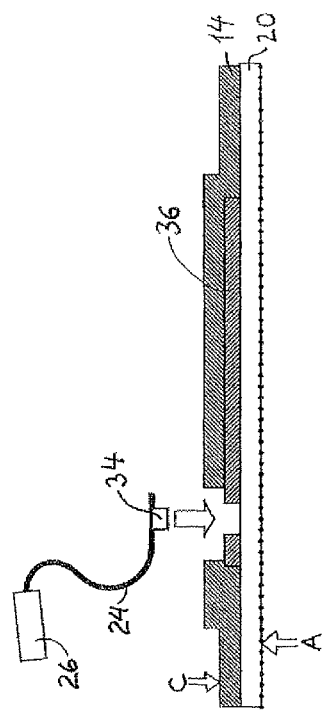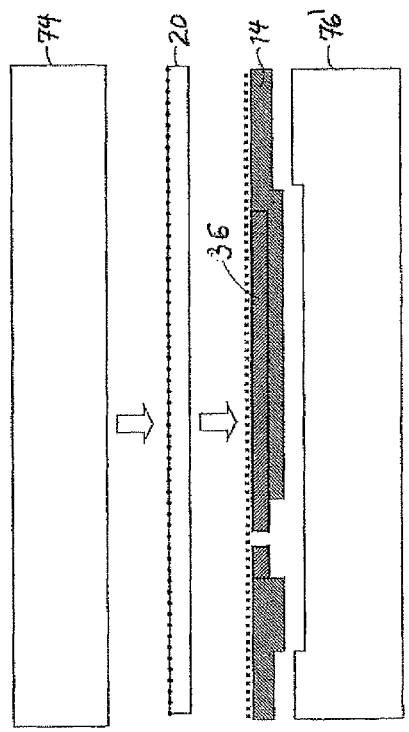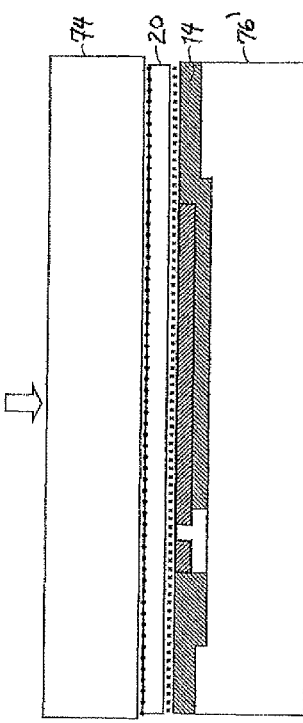

TRIM MEANS FOR A MOTOR VEHICLE HAVING INTEGRATED LIGHTING SYSTEM

FIELD OF THE INVENTION

The invention relates to a lining or trim means for a motor vehicle having integrated lighting system and a method for its manufacture.

BACKGROUND OF THE INVENTION

DE 102 60 831 B3 describes a lighting system for displays of vehicles having a substantially planar carrier, onto which LEDs are set as light sources. Between the LEDs there are electroluminescence films which substantially cover the entire surface of the carrier. Over the arrangement of carrier and lighting system a covering is applied, which forms the visible side and onto which symbols are printed. Between the covering and the carrier there lies in addition a small spacer plate with openings which correspond to the regions at which the symbols are provided on the covering. The lighting system provides displays in a motor vehicle.

In addition, it is known to integrate a background or surface lighting between the carrier and the covering of a trim part in vehicles. U.S. Pat. Nos. 6,464,381 B2 and 6,773,129 B2 describe for example an interior lighting for a vehicle, in which an electroluminescence sheet is inserted between a carrier and a cover layer. In order to prevent the cover layer from bulging in the region of the electroluminescence plate, a recess can be provided in the cover layer or in the carrier, in which the electroluminescence sheet is held. The recess is deeper than the thickness of the electroluminescence sheet so that the structure as a whole becomes discontinuous. Further details of the structure are not described.

U.S. Pat. Nos. 7,150,550 B2 and 7,287,885 B2 describe electroluminescence (EL) lighting arrangements for storage compartments of a motor vehicle, wherein an EL light is formed into a housing wall of the storage compartment and comes to lie on its surface.

DE 10 2005 005 682 A1 and DE 10 2006 012 606 A1 describe illuminable inner trim parts for motor vehicles with a carrier, a planar light source and a cover layer which is permeable to the light of the light source. LEDs and luminous films can be used as light sources. The surface layer can carry any desired shapes, symbols, lettering etc. The cover layer can be a fabric layer.

EP 2 060 444 B1 describes an illuminable inner trim part for a motor vehicle, in which luminescent material, in the form of luminescent particles, is integrated into a carrier or is inserted in the form of a luminescence layer between a carrier and a cover layer. An LED strip serves as light source.

WO02/061380 A2 describes a background lighting arrangement for a motor vehicle with a carrier which has an aperture through which an LED is guided. A two-layered cover layer of a foam material and of a cover material lies over the carrier. The foam material likewise also has a recess to receive the LED, and the cover material is perforated so that the light of the LED can penetrate onto the visible side of the lining part. The structure of carrier and lamp is discontinuous.

The lighting systems described above are also known in the prior art as "hidden until lit" lighting systems. They serve both as background lighting and also for the lighting of decorative elements and displays. It should not be perceivable, for the passenger of a motor vehicle, that a light source or display is provided in the trim part, as long as it is not switched on. In the switched-off state therefore, the trim part is to have an inconspicuous continuous appearance. In this context, a problem exists in the prior art that owing to perforations of the cover layer or indentations or bulges of the cover layer in the region of the light source, discontinuities are created in the appearance of the trim part, which "reveal" the lighting system.

It hence is an object of the invention to provide a trim means for a motor vehicle with integrated lighting system and a method for its manufacture, which avoids the above problems. The aim is that the trim means is not discernible for the passenger of a motor vehicle as long as the lighting system is not active. In addition, the trim means according to the invention is to be simple in construction and can be manufactured at low cost.

SUMMARY OF THE INVENTION

The trim means or lining means according to the invention comprises a carrier having a B side and a C side. The carrier can consist of plastic, in particular of a rigid foam, a fibre composite material or another material. A recess is formed into the B side of the carrier and the carrier has an aperture in the region of or in the vicinity the bottom of this recess. Preferably, the aperture lies at the edge of the recess. A planar lighting unit comes to lie in the recess flush on the B side of the carrier, so that a continuous or substantially continuous planar surface of the carrier including the lighting unit is produced on the B side of the carrier. The depth of the recess is therefore equal or substantially equal to the thickness of the lighting unit wherein the lighting unit preferably has a plate-like shape. At the edge of the lighting unit, a small gap can remain towards the wall of the recess; preferably, however, this gap is virtually zero. The lighting unit has a connection cable which is guided through the aperture to the C side of the carrier, where it is connected with a plug connector, a further conductor or directly with a control unit. A cover layer is applied onto the B side of the carrier and covers the planar lighting unit and at least a portion of the surface of the carrier. The cover layer forms the visible side (A side) of the trim means and is permeable to the light emitted from the lighting unit. The cover layer preferably consists of a foam layer with a cover layer of a textile fabric, perforated leather or Alcantara, plastic film or such like and has a defined translucency of for example 15% to 40%.

The invention provides a simple, low cost and compact lighting system, wherein the lighting unit is integrated into the carrier so that the surface of the carrier is continuous and planar, so that the lighting system is not apparent on the cover layer lying thereabove. All the connections, cabling, control units and such like for the lighting system can be provided on the rear side (C side) of the carrier and are therefore completely hidden. The cabling and the connection of the lighting unit to the on-board electronics of the motor vehicle can take place after the entire completion of the trim means and also after the laminating on of the cover layer.

In its preferred embodiment, the lighting unit comprises at least one point-shaped light source, e.g. an LED, in particular a SMD-LED (light emitting diode as surface-mountable component), and a planar light conductor, e.g. a transparent plastic film, for example of acrylic. The use of electroluminescence film is also possible. Preferably, ultra-thin plastic films are used, having a thickness of less than 1 mm and preferably no more than approximately 0.3 mm. The entire structure of the lighting unit can have a thickness in the range of approximately 0.6 mm to 3 mm, e.g. approximately 1.2 mm. This allows the lighting unit to be accommodated without difficulty in the carrier and allows the trim means to be used for the background lighting or ambient lighting in a motor vehicle.

The lighting unit does not cause any appreciable development of heat and can be set so that it is permanently active as background lighting. It can also be switched on and off selectively as ambient lighting or lighting of displays, decorative elements and such like. With a supply voltage of 12 volt, the power consumption is approximately 2 watt. This is dependent, inter alia, on the number of light sources.

In the preferred embodiment of the invention, the lighting unit is at least partially located on a printed circuit board. In particular with the use of an LED, this and possibly further associated circuit components such as resistors, and lines can be mounted or printed onto the circuit board. According to the invention, it is also possible to print a reflector onto the circuit board, which cooperates with the light conductor. The lighting unit according to the invention can, furthermore, have one or more diffusers and diffuser scrim, which are printed onto the reflector and/or onto the light conductor, or are integrated into the lighting unit in another manner. The lighting unit optionally can be encapsulated in a resin material or other suitable material but, besides this optional encapsulation, does not comprise a separate housing. The housing of the lighting unit is provided only by the carrier and the cover layer.

In an embodiment of the invention, the lighting unit is glued into the recess. This can be done for example by means of spray adhesive or by the use of adhesive film which is applied to the bottom of the depression.

In an embodiment of the invention, the carrier comprises several recesses into which corresponding lighting units are introduced. The lighting units are connected in series and/or in parallel on the C side of the carrier.

The trim means according to the invention can be manufactured in various ways. In an embodiment, firstly the recess is formed in the carrier by pressing using a pressing tool. In this pressing process, the carrier of the trim means is brought, starting from a substantially planar raw material, into its final shape, whilst at the same time the recess is impressed or imprinted. The forming of the recess therefore does not require an additional process step in the manufacture. In the region of or in the vicinity of the bottom of the recess, an aperture is produced in the carrier, for example by punching or water jet cutting. It is also possible to produce the carrier with the recess and if applicable the aperture in the desired shape directly in an injection moulding process or by another method. The connection cable is then guided through the aperture from the B side to the C side of the carrier, and the lighting unit is introduced into the recess. Thereby, an assembly of carrier and lighting unit is produced with a planar or substantially planar, continuous surface on the B side of the carrier. The cover layer is applied onto this surface, in order to cover the lighting unit and at least a portion of the carrier. When the lighting unit is constructed with a planar light conductor and one or more light sources, it is also possible to first only introduce the light conductor into the recess, so that a planar or substantially planar, continuous surface is formed on the B side of the carrier. The light conductor and the carrier are then covered by the cover layer. Subsequently, the light source with its connection cable can be introduced from the C side of the carrier through the aperture into the trim means. The aperture must then be sufficiently large in order to accommodate the light source.

In an alternative configuration of the invention, first, starting from a planar carrier raw material, the aperture is formed in the carrier and the connection cable of the lighting unit is guided through the aperture from the B side to the C side of the carrier. Subsequently, the lighting unit is applied onto the carrier. When the lighting unit is constructed from a planar light conductor and one or more light sources, instead of the entire lighting unit also only the light conductor can be applied onto the carrier.

The carrier with the pre-mounted lighting unit or respectively with the pre-mounted light conductor is introduced into a pressing tool and is deformed such that the lighting unit or respectively the light conductor is pressed into the carrier and comes to lie in the recess which is thereby formed in the carrier. The actual positioning of the lighting unit or respectively of the light conductor can be ensured for example by means of a magnetic insert in the pressing tool. During the deformation, further desired design features can be formed in the carrier. After the deformation, the lighting unit lies flush in the carrier, so that as a whole a substantially continuous surface of the carrier is produced. The cover layer is applied onto this surface. If applicable, subsequently the light source with connection cable is introduced into the trim means from the C side of the carrier through the aperture.

This second embodiment of the method according to the invention has the advantage, compared with the first one, that it is ensured that the lighting unit comes to lie flush in the carrier. No problems arise owing to tolerances of the tools, because the lighting unit is formed directly into the carrier. On the other hand, this method constitutes a greater stress on the lighting unit by the pressing tool. The person skilled in the art will select the best manufacturing method, as described above, according to the circumstances, or will select an alternative method.

The trim means according to the invention is used for example as a roof lining in a motor vehicle, but it may also be used for illumination or display in door inner trim parts, in the instrument panel, in storage compartments, on seats and cushions or at another location in a motor vehicle or in other technical fields.

SHORT DESCRIPTION OF DRAWINGS

The invention is described in further detail below with in view of various embodiments, with reference to the drawings.

FIGS. 9A and 9B show diagrammatic sectional representations through an embodiment of a lighting unit of the trim means according to the invention, wherein FIG. 9B is an exploded representation of FIG. 9A;

FIG. 10 shows a top view onto the lighting unit of FIGS. 9A and 9B;

FIGS. 11 to 22 illustrate a sequence of steps for the manufacture of the trim means of the invention according to a first process sequence, wherein FIGS. 14 to 16 illustrate alternative steps for the fastening of the lighting unit on the carrier;

FIGS. 23 to 30 illustrate a sequence of steps for the manufacture of the trim means of the invention according to a second process sequence;

FIGS. 31 to 43 illustrate a sequence of steps for the manufacture of the trim means of the invention according to a third process sequence.

DETAILED DESCRIPTION OF EMBODIMENTS

Figure 1:
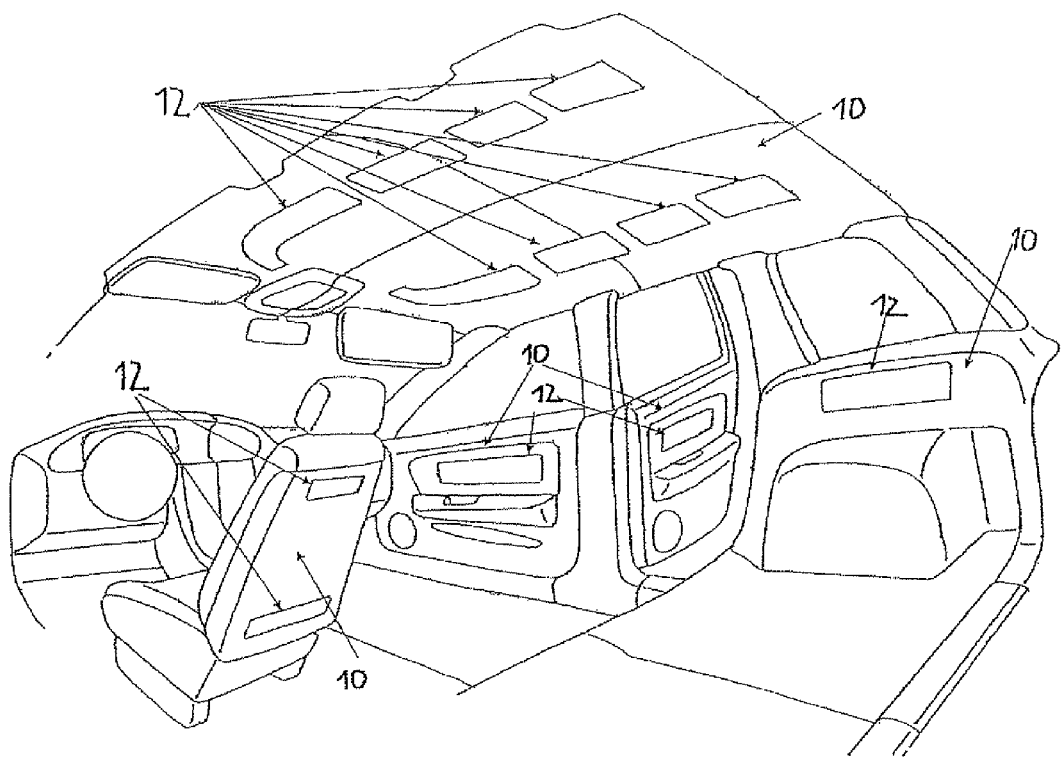
FIG. 1 shows an interior view of a motor vehicle with trim means according to the invention.

FIG. 1 shows an interior view of a motor vehicle, in which several lining arrangements or trim means 10 according to the invention are used for the roof lining, the interior lining and the rear lining of the front seats. Lighting units 12, which are illustrated diagrammatically in FIG. 1, are integrated into the lining arrangement. In practice, the lighting units 12 are, in themselves, not visible in the interior of the vehicle, because they are covered by a cover layer. Only the surfaces illuminated by the lighting units are visible, if the lighting is switched on. This concept is also designated as "hidden until lit".

Figure 2:
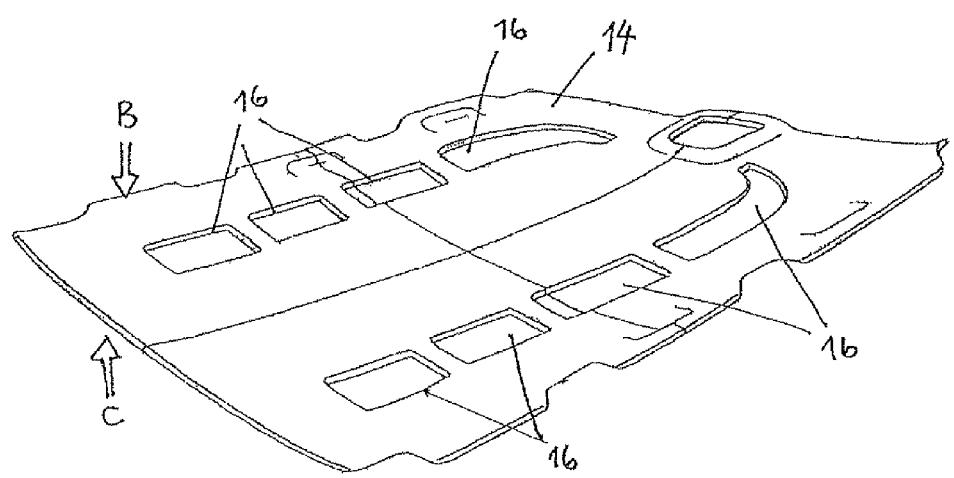
FIG. 2 shows an isometric representation of a carrier of the trim means according to the invention.

FIG. 2 shows a carrier 14 of the lining arrangement 10, which forms the roof lining in FIG. 1. The carrier 14 has a B side (top in FIG. 2) and a C side (bottom in FIG. 2). Recesses 16 to accommodate the lighting units are formed on the B side. The depressions 16 are closed at their bottom side, i.e. they are connected to the C side of the carrier only via apertures described below. The carrier can consist of plastic and can be produced by an injection moulding method. The carrier can also consist of a fibre composite material or another shapeable, e.g. thermoplastic or duroplastic material. In an embodiment, the carrier 14 is a conventional substrate of a roof lining. On the B side of the carrier 14 a diffuser scrim layer, e.g. a light-coloured non-woven textile layer, can optionally be applied. The carrier 14 is preferably brought into the desired shape in a pressing tool, as is described further below.

Figure 3:
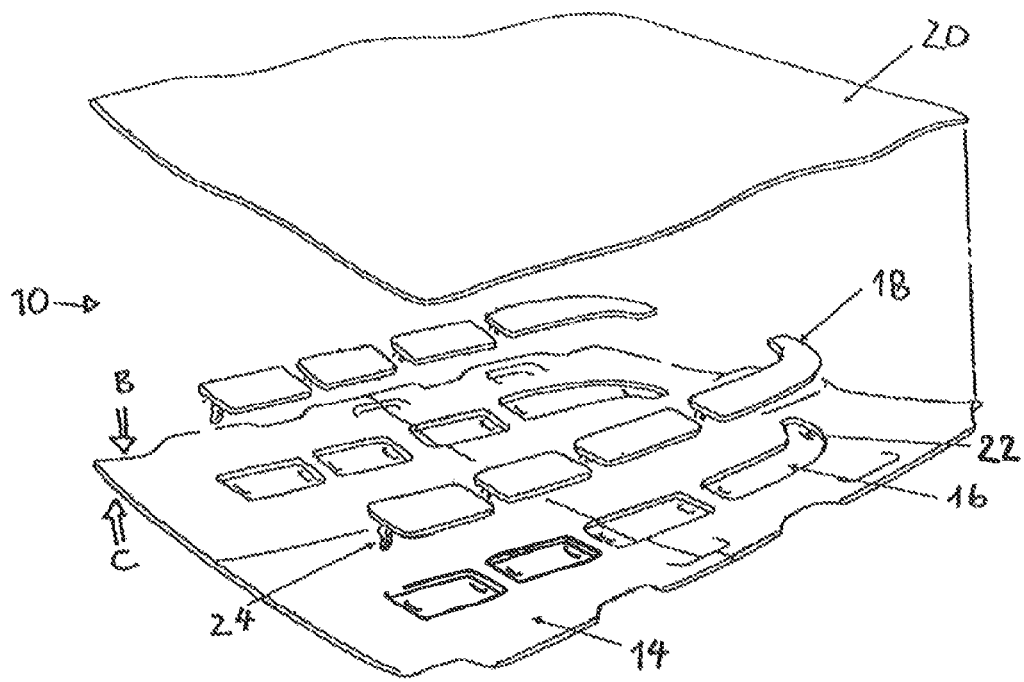
FIG. 3 shows an isometric exploded representation of a trim means according to the invention.

FIG. 3 shows diagrammatically in exploded representation a lining arrangement 10 according to the invention, which forms the roof lining in FIG. 1. The lining arrangement 10 comprises the carrier 14 of FIG. 2 and a series of lighting units 18, which are inserted into the recesses 16. The carrier 14 and the lighting units 18 are covered by a cover layer 20, which may have a single-, two- or multi-layered structure. The cover layer comprises for example a base material of foam and a cover layer of textile, perforated leather or Alcantara, semi-transparent plastic, e.g. TPU or PVC, or a non-woven material, e.g. a carpet material. In FIG. 3 diagrammatic apertures 22 are illustrated, which are formed in the region of the bottom 16' of the recesses 16, respectively in the vicinity of the recess edges. In the embodiment which is shown, each recess has two apertures 22 in its bottom 16' on opposite sides of the recesses. These apertures 22 serve for guiding through of connection cables 24 of the lighting units 18 from the B side of the carrier 14 to its C side. The connection cables 24 can be provided for example in the form of lines on a flexible printed circuit board (FPC) or constructed as ribbon cables. The term "connection cable" comprises in the context of this invention every element which is suited to couple the light source with a terminal on the C side of the carrier. The details of the lighting units 18 are presented in detail below.

Figure 4:
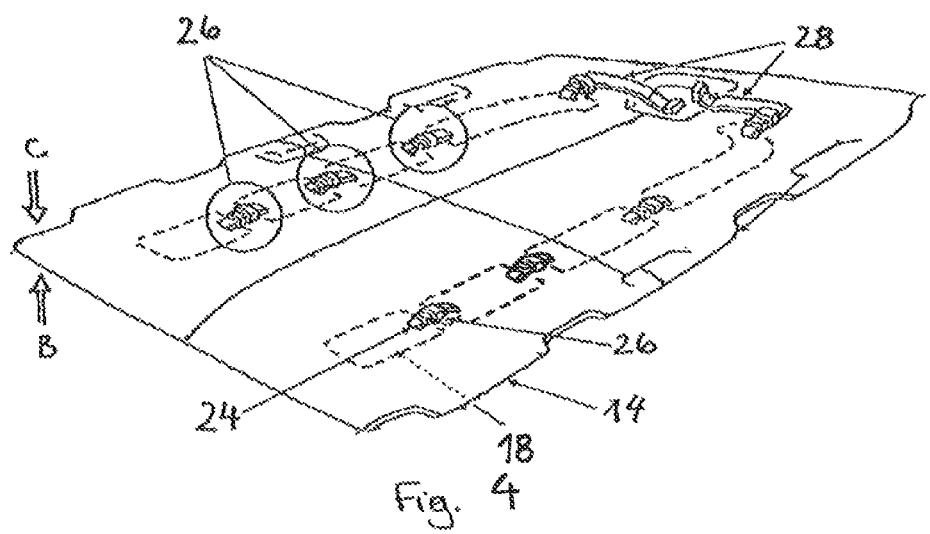
FIG. 4 shows a bottom view of the trim means of FIG. 3.

FIG. 4 shows a bottom view of the lining arrangement of FIG. 3, i.e. the C side of the carrier 14. The lighting units 18 lying on the B side are illustrated in dashed lines. The C side of the carrier 14 is closed but for the apertures provided for the connection cables 24. These lighting units 18 are connected in series on the C side of the carrier by electric plug connectors 26. The electric plug connectors 26 are coupled with the lighting units via the connection cables 24. The series connection of several lighting units, in the embodiment shown, is connected to a cable harness or cable loom 28. They are supplied with current and actuated via the cable loom 28. The cabling of the lighting units 18 can take place after the completion of the lining arrangement, in particular after its mounting on the carrier 14 and after the laminating of the cover layer 20.

Figure 5:
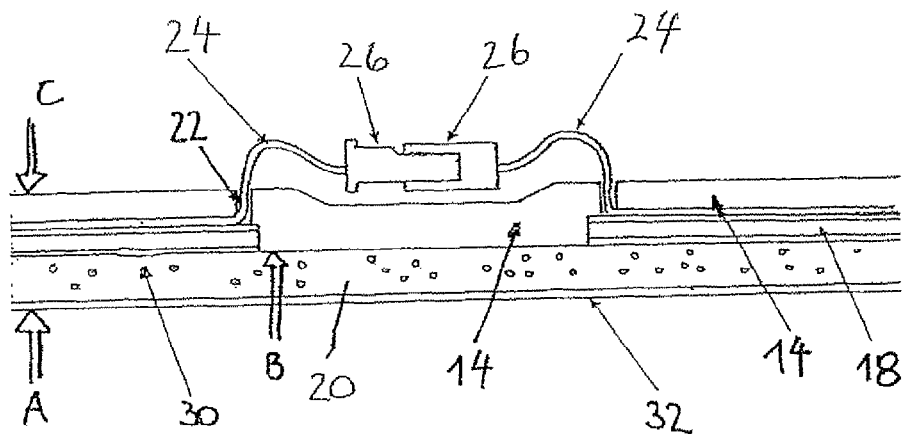
FIG. 5 shows a diagrammatic sectional illustration through a portion of the trim means according to the invention.

FIG. 5 shows a diagrammatic sectional representation through a portion of a lining arrangement according to an embodiment of the invention. Corresponding components as in the previous figures are marked by the same reference numbers. In the illustration of FIG. 5, the C side of the carrier is at the top and the B side of the carrier is at the bottom of the drawing. The surface of the cover layer 20 applied onto the carrier forms the visible side or A side of the lining arrangement. In FIG. 5 it can be seen how the lighting units 18, which are only illustrated diagrammatically, sit in recesses on the B side of the carrier 14. The lighting units 18 are connected on the C side of the carrier via the connection cables 24 and plug connectors 26. The connection cables 24 are guided through apertures 22 which are provided for this purpose. In the embodiment of FIG. 5, the cover layer 20 is constructed in two layers, with a base material 30 of foam material and a cover material 32 of textile, perforated leather or Alcantara, a semi-transparent plastic film or such like. The cover material 32 of the cover layer forms the visible side of the lining arrangement.

Figure 6:
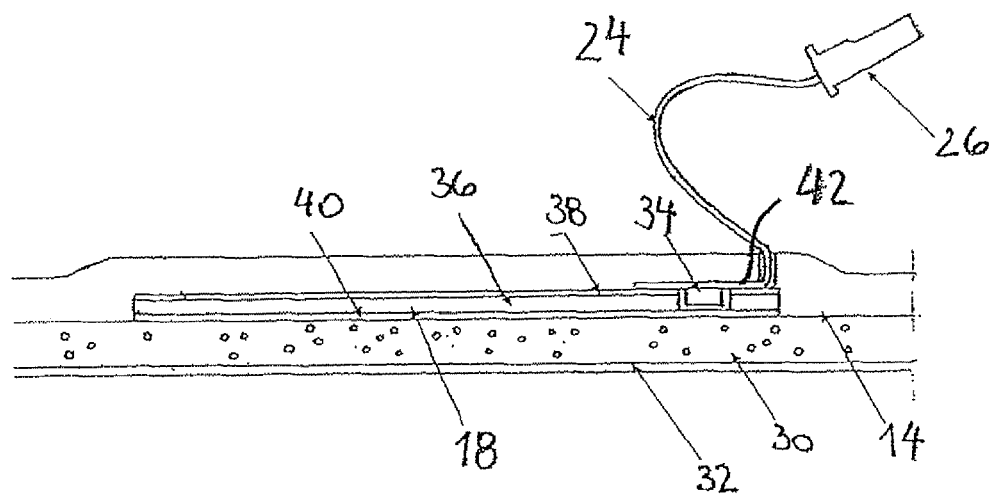
FIG. 6 shows a further diagrammatic sectional illustration through a portion of the trim means according to the invention.

FIG. 6 shows a similar illustration to FIG. 5, wherein the lighting unit 18 is shown with further details. Corresponding components as in the preceding figures are marked by the same reference numbers.

The lighting unit 18 comprises a point-shaped light source 34, preferably an LED and more preferably a SMD-LED (light emitting diode as surface mountable component). If the connection cable 24 is provided for example as a printed flexible circuit board, then the light source 34 can be connected directly to the connection cable 24, in particular soldered thereto. The lighting unit 18 further comprises a light conductor 36 for the provision of an LED background illumination, also designated as LED backlight. The light conductor 36 is, for example, a planar sheet of a transparent plastic, such as acrylic glass. The use of electroluminescence film is also possible. In the embodiment which is shown, the light of the light source 34 is coupled in on one side of the light conductor 36. The LEDs can, however, be arranged at any other location of the light conductor, for example around the periphery of the sheet or distributed over the surface of the light conductor. They can also be arranged relative to the light conductor for the representation of a particular shape, graphic or text.

In the embodiment shown, the lighting unit further comprises a reflector film 38 and a diffuser film 40. The reflector film 38 lies between the carrier 14 and the light conductor 36, and the diffuser film 40 lies over the light conductor 36. These films can, for example, be printed, e.g. by creen printing, or applied in a different manner. The flexible circuit board 42 forming the connection cable can extend over the entire length of the lighting unit and accommodate not only the light source 34 and if applicable associated circuit components, such as a resistor, but also the printed reflector film 34. Of course, a rigid circuit board, e.g. of a glass fibre mat impregnated with epoxy resin (material identification FR4), can also be used in the area of the lighting unit.

FIG. 7 shows once again a different view of the bottom side (C side) of the lining arrangement according to the invention, wherein corresponding parts are marked by the same reference numbers as in the preceding figures. In the embodiment which is shown, the connection cable 24 is constructed as a ribbon cable. The lighting unit 18 on the B side of the carrier 14 is represented in dashed lines.

Figure 7:
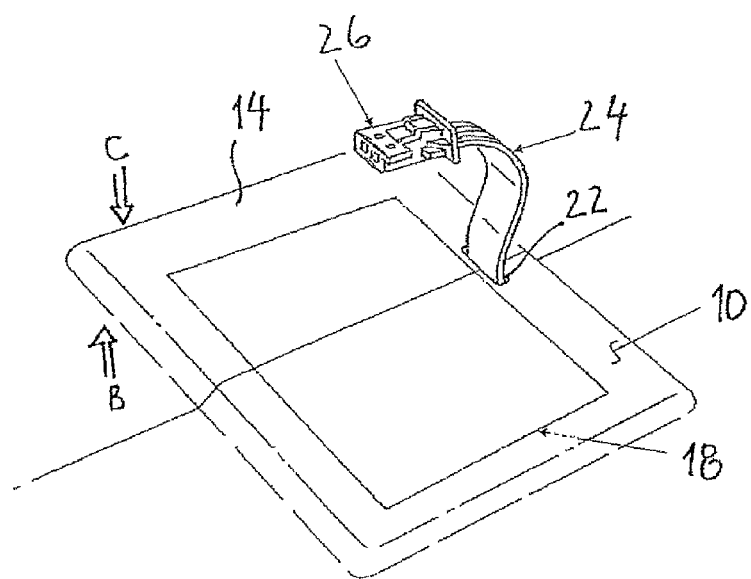
FIG. 7 shows in isometric representation a bottom view of a portion of the trim means according to the invention.
Figure 8:
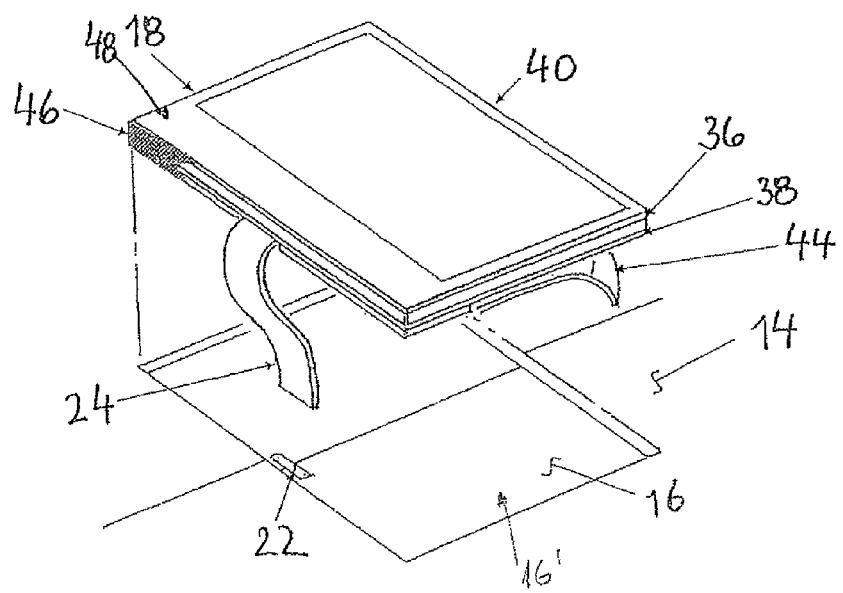
FIG. 8 shows in isometric representation a top view onto a portion of the trim means according to the invention during mounting.

FIG. 8 shows the B side of the lining arrangement of FIG. 7 (without cover layer) in partial exploded illustration. Corresponding components are marked by the same reference numbers as in the preceding illustrations. FIG. 8 shows how the lighting unit 18 is to be inserted into the recess 16 of the carrier 14, wherein the connection cable 24 is guided through the aperture 22 in the bottom 16' of the depression. The lighting unit 18 is constructed with the diffuser film 40, the light conductor 36 and the reflector film 38. An adhesive layer 44, e.g. an adhesive film, applied to the bottom 16' serves for the fastening of the lighting unit 18 on the carrier 14. In the embodiment which is shown, a masking element 46, which limits the light emission of the lighting unit 18 to the side, is arranged on the periphery of the lighting unit 18. Another masking element 48 can be provided on the upper side of the lighting unit 18. The masking element 48 can, for example, be printed onto the diffuser film 40. It can delimit a display or a decorative element.

FIGS. 9A and 9B show diagrammatic sectional representations through a further embodiment of a lighting unit of the lining arrangement according to the invention, wherein FIG. 9B is an exploded representation of FIG. 9A. Corresponding components are marked by the same reference numbers as in the preceding figures. The lighting unit of FIGS. 9A and 9B comprises a light source 34, which is constructed as a SMD-LED and is connected with the connection cable 24. The connection cable 24 is preferably realized in a flexible printed circuit board, onto which also the light source 34 is soldered. The lighting unit further comprises a light conductor 36 for example in the form of a thin transparent plastic sheet. In the embodiment which is shown, a scattering structure or a scattering pattern 50 is applied, e.g. printed, onto the light conductor 36. A reflector film 38 lies beneath the light conductor 36 (top in FIGS. 9A and 9B), and a diffusor film 40 lies over the light conductor 36. The diffusor film 40 is covered by a masking element 48, which may for example contain a printed graphic. A lateral masking element 46 serves for lateral light delimitation. The light conductor 36 is connected with the reflector film 38 and the diffuser film 40 via adhesive tapes 52. An adhesive layer 44, which is provided with a peelable protective film 54, is additionally applied onto the side of the lighting unit which is brought in contact with the carrier. Instead of the adhesive layer 44 which is applied in advance, the connection between the lighting unit and the carrier can also take place by the application for example of a spray adhesive immediately before mounting. It is also possible to fix the lighting unit 18 in a different manner than by bonding on the carrier 14, for example by means of the cover layer 20 lying thereabove (not shown in FIGS. 9A and 9B). For better clarity, the reference numbers are omitted in FIG. 9A.

FIG. 10 shows a top view onto the lighting unit of FIGS. 9A and 9B. Corresponding components are marked by the same reference numbers. It can be seen from FIG. 10 that the lighting unit can comprise several light sources 34 which are arranged along an edge of the light conductor 36 and, in the embodiment shown, are connected in series. The light sources 34 are connected with the plug connector 26 via the connection cable 24. The light sources 34 do not necessarily have to be arranged on the edge of the light conductor 36, but rather they can for example also project in recesses therein.

Figure 15:
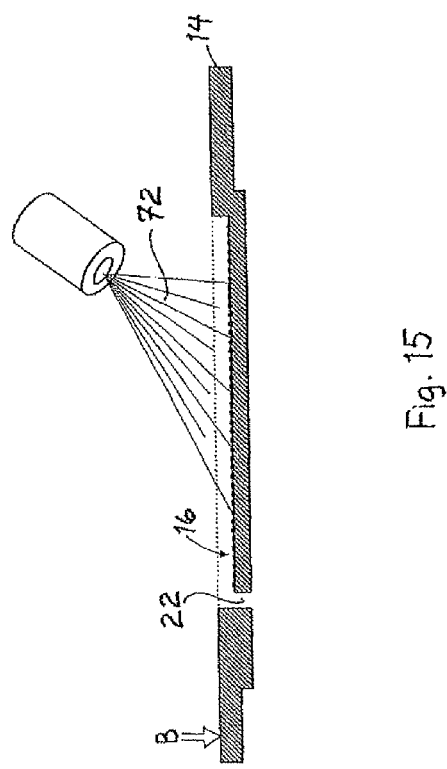
Figure 16:
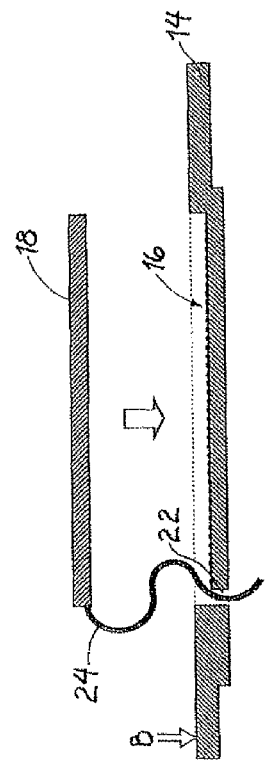

FIGS. 11 to 22 illustrate a sequence of process steps for the manufacture of the lining arrangement according to the invention, wherein FIGS. 14 to 16 illustrate alternatives to the fastening of the lighting unit on the carrier. FIG. 11 shows a pressing tool with an upper mould 56 and a lower mould 58. A material blank 60 for the manufacture of the carrier is introduced into the pressing tool. In the embodiment which is shown, the blank comprises two structured sheets of PUR foam 62, between which a glass fibre mat 64 is inserted. The glass fibre mat 64 and the PUR foam sheets 62 are connected via an adhesive layer 66. A light-coloured non-woven diffuser scrim layer 68 is additionally applied on the side of the material blank 60, which later forms the B side of the carrier. The structure of the material blank 60 shown in FIG. 11 is solely by way of example.

For the manufacture of the carrier 14, the upper mould 56 is lowered onto the lower mould 58 and the material blank 60 is deformed, in order to produce the structure with the recess 16, shown in FIG. 12. The pressing tool is opened and the finished carrier 14 can be removed.

Subsequently, as shown in FIG. 13, the aperture 22 is formed in the carrier 14, for example by water jet cutting with a water jet 70 or by punching. The aperture 22 preferably lies at the very edge of the recess 16. Several apertures 22 can also be formed in a recess or in the vicinity of a recess.

If a lighting unit 18 is used with an adhesive layer 44 which has been applied in advance, then in a next step, as shown in FIG. 14, the protective film 54 is removed from the adhesive layer and the connection cable 24 is guided through the aperture 22 from the B side to the C side of the carrier 14. The lighting unit 18 can then be bonded securely into the recess 16 by means of the adhesive layer 44.

Figure 17:
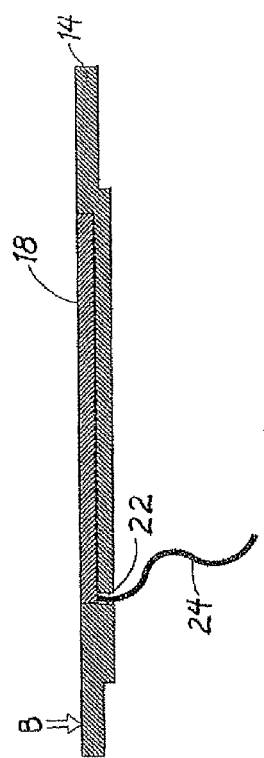

If the lighting unit 18 does not have an adhesive layer which has been applied in advance, then in an alternative embodiment, which is shown in FIG. 15, a spray adhesive 72 can be applied onto the base of the recess 16. Subsequently, the connection cable 26 is guided through the aperture 22 from the B side to the C side of the carrier 14, as shown in FIG. 16, and the lighting unit 18 is bonded into the recess 16 of the carrier 14. In both cases, the structure shown in FIG. 17 is hence obtained. It is not strictly necessary to bond the carrier 14 and the lighting unit 18.

The lighting unit 18 sits flush in the recess 16 of the carrier 14, so that as a whole a continuous or substantially continuous planar surface is produced. On the periphery of the lighting unit 18, a slight gap to the edge of the recess can arise which, however, should be smaller than 1 mm. Deviating from the embodiment which is shown, the recess 16 can also be formed with an encircling shoulder, and the aperture for the connection cable can be provided in the region of the shoulder.

Figure 18:
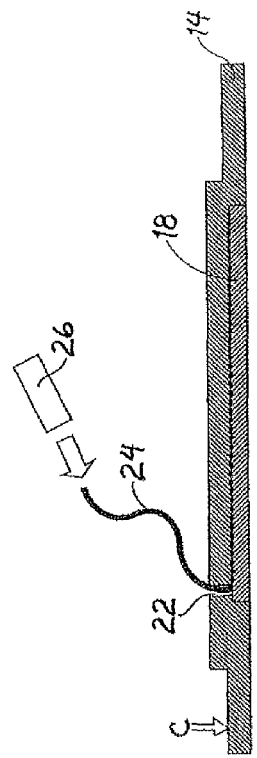

In a next process step, which is shown in FIG. 18, the connection cable 24 is connected on the rear side (C side) of the carrier 14 with a plug connector 26. This process step could also take place, if applicable, at a later time.

Subsequently, as shown in FIG. 19, an adhesive layer 72 is applied, e.g. sprayed, onto the B side of the carrier, i.e. onto the composite of carrier 14 and lighting unit 18.

The composite which has been prepared in this way is introduced together with a cover layer 20 into a pressing tool with a further upper mould 74 and a further lower mould 76, as shown in FIG. 20. The upper mould 74 is closed on the lower mould 76, see FIG. 21, wherein the lower mould 76 has a recess for the plug connector 26, so that the latter is not damaged during the pressing process. In this way, the cover layer 20 is securely connected or respectively laminated with the B side of the carrier 14 and the lighting unit 18.

The lower and upper moulds 74, 76 are opened and the finished lining arrangement can be removed, as shown in FIG. 22.

Figure 23:
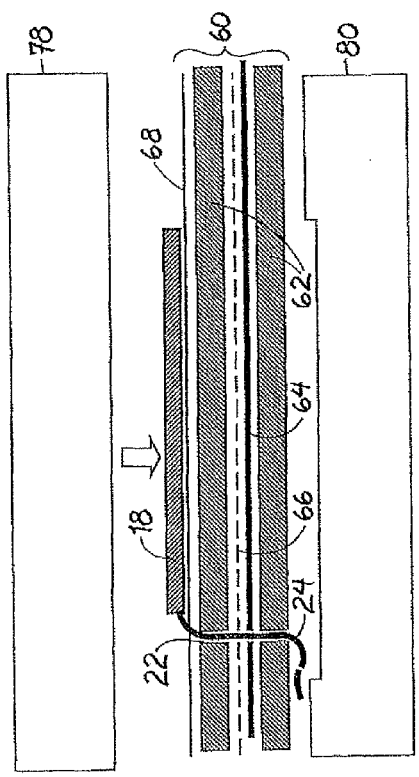

FIGS. 23 to 30 show an alternative sequence of steps of a method for the manufacture of a lining arrangement according to the invention. Corresponding parts are marked by the same reference numbers. The method uses a material blank 60, which can be constructed as in the first embodiment or differently. The material blank 60 illustrated in FIG. 23 corresponds to that of FIG. 11 and is not explained in detail here again. Deviating from the first embodiment, in the alternative concept the aperture 22 for the connection cable 24 of the lighting unit 18 is already formed in the material blank 60, for example by punching or water jet cutting. The connection cable 24 is guided through the aperture 22, and the lighting unit 18 is placed at the desired position onto the material blank 60. The arrangement, which is thus pre-mounted, is introduced into a pressing tool with an upper mould 78 and a lower mould 80. The mould surface of the upper tool 78 in the mould cavity is substantially planar, as shown in FIG. 23. The mould surface of the lower mould 80 in the mould cavity has a recess, in order to receive material which is displaced during the pressing process. The precise positioning of the assembly of the material blank 60 and of the lighting unit 18 in the moulding tool can be ensured for example in that a magnet (not shown) is integrated into the upper mould 78, to which the lighting unit 18 aligns itself. Thereby, small position tolerances can be adjusted. The recess in the lower mould 80 should in any case be so large that it can reliably receive the material displaced by the lighting unit 18, and the connection cable 24.

Figure 25:
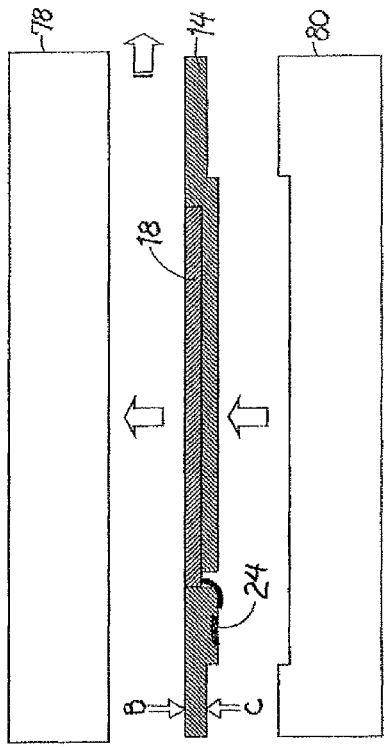
Figure 24:
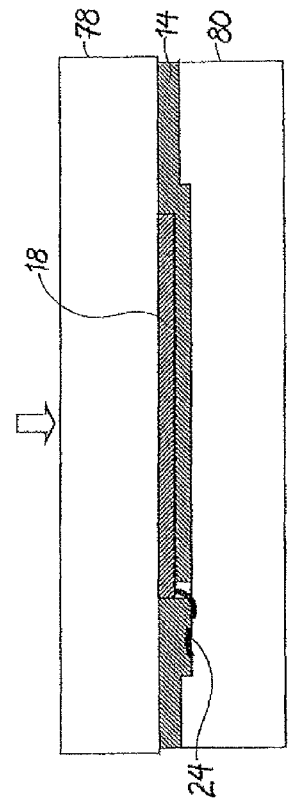

The pressing tool is closed by the upper mould 78 being lowered onto the lower mould 80, as shown in FIG. 24. In doing so, the material blank 60 is deformed, in order to form the carrier 14. At the same time, the lighting unit 18 is pressed into the carrier 14; see FIG. 24. After the opening of the pressing tool, a composite of carrier 14 and lighting unit 18 is obtained, as shown in FIG. 25, with a continuous or substantially continuous planar surface on the B side of the carrier.

Figure 26:
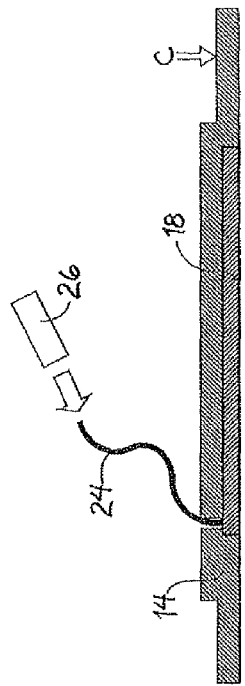

After the removal of the unit of carrier 14 and lighting unit 18 from the pressing tool, the connection cable 24 can be connected on the C side of the carrier 14 with a plug connector 26, see FIG. 26, wherein this step also can be carried out later in the process sequence.

The further method steps which are shown in FIGS. 27 to 30 correspond to FIGS. 19 to 22 of the first embodiment, to which reference is made. These steps are therefore no longer described in detail. The pressing tool with upper mould 74 and lower mould 76 can also be configured as in the first embodiment. The resulting lining arrangement differs from the product manufactured in the first method variant in that the lighting unit 18 is not bonded into the recess of the carrier 14. It is held in a force-fitting manner in the recess owing to the pressing process, and is fixed by the laminated-on cover layer 20.

Figure 35:
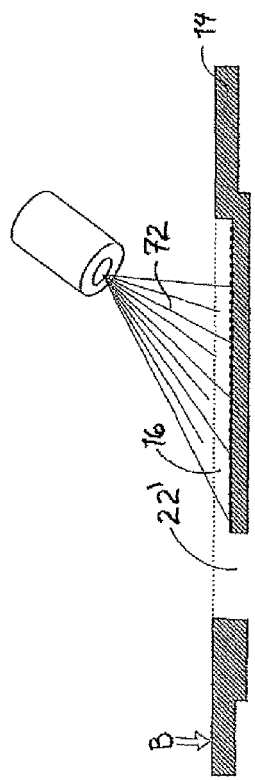
Figure 36:
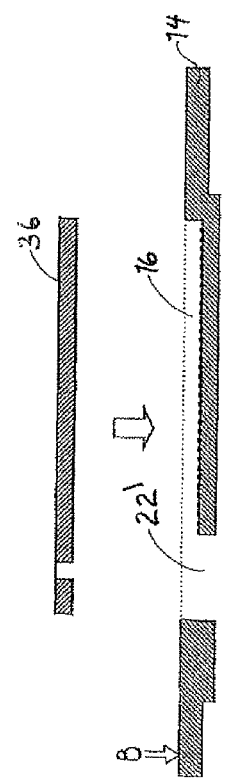
Figure 38:
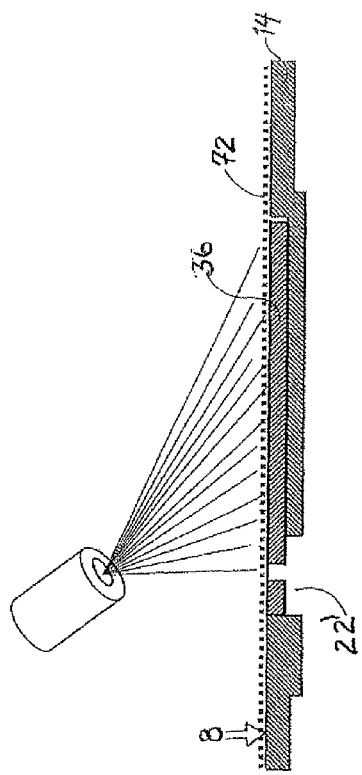

FIGS. 31 to 43 illustrate a sequence of process steps for the manufacture of the lining arrangement of the invention according to a third embodiment, wherein FIGS. 34 to 36 illustrate alternatives for the fastening of the light conductor of the lighting unit on the carrier. Corresponding parts are marked with the same reference numbers as in the previously described figures. The first process steps for the shaping of the carrier, which are shown in FIGS. 31 and 32, are identical to the process steps described with reference to FIGS. 11 and 12. Reference is made to the above description.

After the shaping of the carrier, as shown in FIG. 33, the aperture 22' is formed in the carrier, for example by water jet cutting with a water jet 70 or by punching. The aperture 22' preferably lies at the edge of the recess 16. Several apertures 22' can be formed in the recess or in the vicinity of the recess. In this third embodiment, the aperture 22' is slightly larger than in the previously described embodiments, not only because the connection cable 24 is guided through the aperture, but because it also receives one or more light sources, as is described further below.

Figure 37:
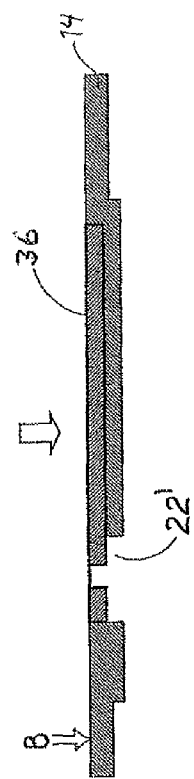

The third example embodiment differs from the preceding process sequences in that the lighting unit as a whole is not introduced into the carrier in one step, but rather that firstly only the light conductor 36 is introduced into the recess 16 of the carrier 14. The light conductor 36 can be a light-conductive plastic sheet, which receives the light from one or more point-shaped light sources, e.g. LEDs, and emits the light over its surface. Apart from this difference, FIGS. 34 to 37 correspond to FIGS. 14 to 17 of the first embodiment and show how the light conductor 36 is bonded into the recess 16 of the carrier 14, wherein e.g. an adhesive layer 44, applied in advance, or a spray adhesive 72 can be used. Irrespective of the type of bonding or other fastenings of the light conductor 36 in the carrier 14, the structure shown in FIG. 37 is produced, wherein the light conductor 36 lies flush in the recess 16 of the carrier 14, so that the composite as a whole has a continuous or substantially continuous planar surface. In this respect, reference is made to the detailed description above.

It is also possible to produce the structure shown in FIG. 37 by a method according to FIGS. 23 to 25, wherein also in this case connection cables and light source(s) are initially omitted and the aperture 22' is to be constructed slightly larger than in the first embodiments.

After the manufacture of the composite of carrier 14 and light conductor 36, which is shown in FIG. 37, the cover layer 20 is applied onto the light conductor 36 and the B side of the carrier 14, as shown in FIGS. 38 to 41. These figures correspond largely to FIGS. 19 to 22 of the first embodiment, to the description of which reference is made. As the light source with its connection cable is not yet coupled with the light conductor 36 and the carrier 14, the lower mould 76' does not have to have a recess to receive the connection cable 24 and its plug connector 26, as can be seen from a comparison of FIGS. 39 to 41 with FIGS. 20 to 22. Several advantages result from this: The composite of carrier 14 and light conductor 36 can be pressed more uniformly with the cover layer 20, because the lower mould 76' lies with its entire surface against the C side of the carrier 14. Thereby, a high-quality connection is obtained. In addition, there is no danger that during the pressing process the connection cable 24 and/or the plug connector 26 or even the light source 34 are damaged. They are no longer exposed at all to the corresponding compressive stresses.

Figure 43:
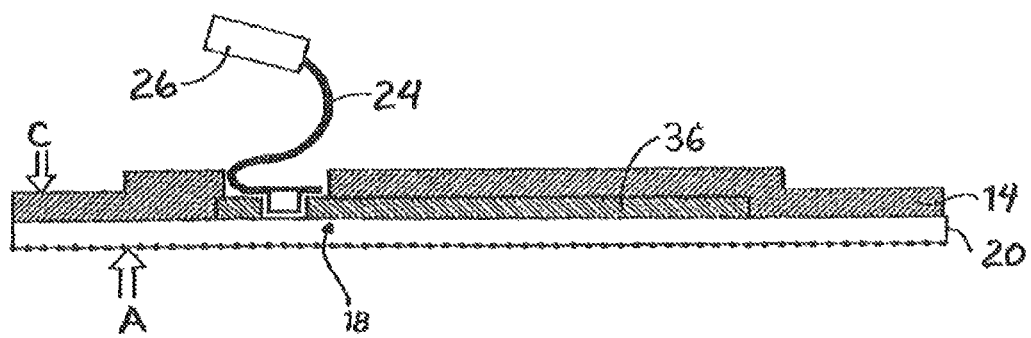

After the opening of upper mould 74 and lower mould 76', the composite of carrier 14, light conductor 36 and cover layer 20 can be removed from the pressing tool, in order to insert the light source 34 with its connection cable 24 and plug connector 26 into the composite, as shown in FIGS. 42 and 43. The entire active portion of the lighting unit is therefore only introduced into the carrier after the entire composite, including the cover layer 20, is produced. Thereby, the risk of damage to the lighting unit during the manufacture of the lining arrangement is minimized, and it is simpler to maintain the lighting unit and to exchange possibly damaged connection cables or light sources.

Figure 44:
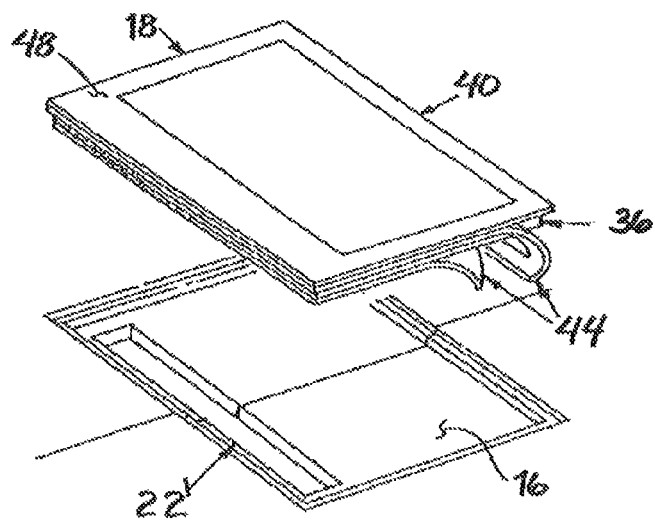
FIGS. 44 to 46 show in isometric representation a top view onto the trim means of the invention during the mounting according to the third process sequence.

FIGS. 44 to 46 show again in isometric representation individual steps of the third embodiment. In FIG. 44 it is illustrated how the lighting unit 18 is inserted into the recess 16 of the carrier. This illustration corresponds to FIG. 8 of the first embodiment, to which reference is made. As illustrated, in this third embodiment initially the connection cable and the light source are absent, and the aperture 22' is constructed correspondingly larger, in order to be able to insert the light source subsequently, i.e. after the application of the cover layer 20.

Figure 45:
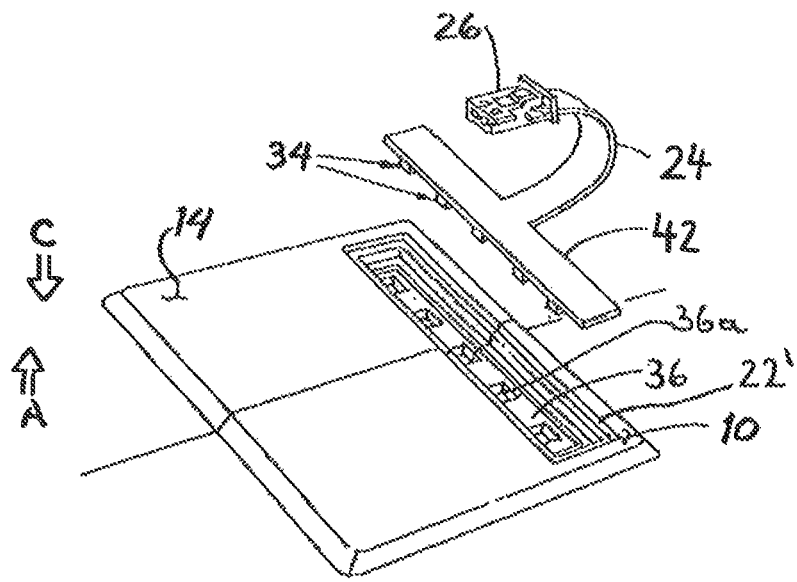

The insertion of the light sources 34, which sit on a flexible circuit board 42 and are connected with the connection cable 24 and the plug connector 26, is shown in FIG. 45. The flexible circuit board 42 with the light sources 34 thereon is inserted through the enlarged aperture 22' into the lining arrangement 10. In so doing, the light sources 34 come to lie in recesses 36a in the light conductor 36, in order to supply light into the light conductor. As set forth above, one or more LEDs can be arranged at any suitable location of the light conductor, for example around the periphery of the light-conducting sheet, or distributed over the surface of the light conductor.

They can also be arranged so that in connection with the light conductor they constitute a particular shape, graphic or text. The light of the light sources 34 is preferably supplied at an interior or exterior edge of the light conductor.

Figure 46:
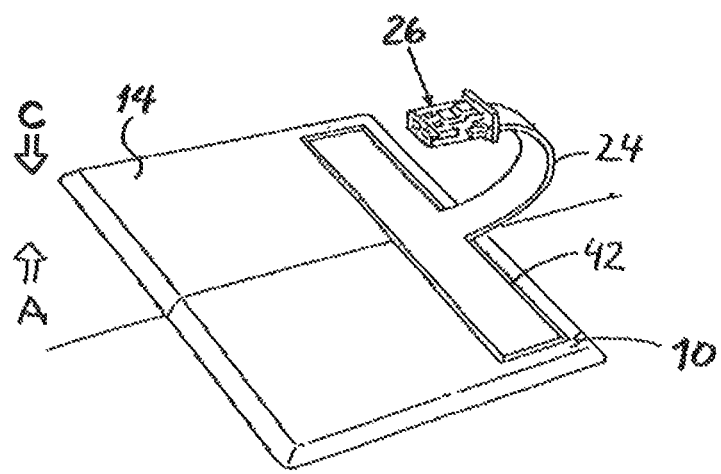

FIG. 46 shows in isometric representation the finished lining arrangement according to the invention, wherein in the figure the C side of the lining arrangement lies at the top and the A side lies at the bottom. The illustration corresponds in this respect to FIG. 7 wherein, however, in this third embodiment, as explained above, the cover layer (not shown in FIG. 46) is already applied onto the carrier 14 before the light source(s) of the lighting unit is/are inserted. Thereby, the lighting unit as a whole can be serviced better, and the risk of damage to the lighting unit during the manufacture of the lining arrangement is substantially reduced.

The cabling of the connection cable 24, its coupling to a plug connector 26, a control unit and such like can take place in each of the embodiments, after the complete lining arrangement is produced. Subsequently, the lining arrangement is installed in the motor vehicle, e.g. as a roof lining, side lining or such like.

It shall be understood that the described details of the embodiments do not necessarily have to be contained in all configurations of the invention. Individual features can be omitted or exchanged, in so far as they are not necessary to solve the problem according to the invention.

List of Reference Numbers

10 lining arrangement or trim means
12 lighting units
14 carrier
16 recess
16' bottom of recess
18 lighting units
20 cover layer
22, 22' aperture
24 connection cable
26 plug connector
28 cable harness
30 base material of the cover layer
32 cover material of the cover layer
32 light source
34 light conductor
36a recesses
38 reflector film
40 diffuser film
42 flexible circuit board
44 adhesive layer
46 masking element
48 masking element
50 scattering pattern
52 adhesive tapes
54 protective film
56 upper mould
58 lower mould
60 material blank
βPUR foam sheets
64 glass fibre mat
66 adhesive layer
68 diffuser scrim layer
70 water jet
72 adhesive layer
74 upper mould
76, 76' lower mould
78 upper mould
80 lower mould

The invention claimed is:

1. Trim means for a motor vehicle with integrated lighting system, which comprises:
    a carrier having a B side and a C side, wherein a recess having a bottom is formed into the B side of the carrier and the carrier has an aperture in the region of or in the vicinity of the bottom of the recess,
    a planar lighting unit, which comes to lie flush in the recess on the B side of the carrier and has a connection cable, which is guided through the aperture to the C side of the carrier, so that on the B side of the carrier a continuous or substantially continuous planar surface of the carrier with the lighting unit is created, and
    a cover layer, which on the B side of the carrier covers the planar lighting unit and at least a portion of the surface of the carrier and forms an A side of the trim means, wherein the cover layer is permeable to the light emitted from the lighting unit.

2. Trim means according to claim 1, wherein the thickness of the planar lighting unit corresponds to the depth of the recess.

3. Trim means according to claim 1, wherein the planar lighting unit is plate-shaped.

4. Trim means according to claim 1, wherein the lighting unit comprises at least one point-shaped light source, in particular an LED, and a planar light conductor, in particular a transparent plastic film.

5. Trim means according to claim 1, wherein the lighting unit is arranged at least partially on a printed circuit board.

6. Trim means according to claim 1, wherein the lighting unit comprises at least one of: a printed reflector and a printed diffuser.

7. Trim means according to claim 1, wherein the lighting arrangement has a masking layer for controlling the emission of light.

8. Trim means according to claim 1, wherein the lighting unit is at least partially bonded into the recess.

9. Trim means according to claim 1, wherein the carrier has several recesses, into which corresponding lighting units or portions of lighting units are introduced, and that the light sources of the lighting units are connected in series or in parallel or in series and parallel on the C side of the carrier.

10. Method for the manufacture of a trim means according to claim 1, wherein the recess is formed in the carrier by pressing in a pressing tool, and subsequently the aperture is produced in the carrier in the region of or in the vicinity of the recess.

11. Method for the manufacture of a trim means according to claim 1, wherein the lighting unit comprises at least one point-shaped light source and a planar light conductor, wherein first the aperture is produced in the carrier, and subsequently at least the light conductor of the lighting unit is applied onto the carrier and the carrier with the light conductor applied thereon is deformed by pressing in a pressing tool such that the light conductor is pressed into the carrier and comes to lie in the recess thereby formed in the carrier.

12. Method according to claim 10, wherein the connection cable is guided through the aperture from the B side to the C side of the carrier, and the lighting unit is applied to the carrier, before the cover layer is applied onto the lighting unit and at least a portion of the carrier.

13. Method according to claim 11, wherein the connection cable is guided through the aperture from the B side to the C side of the carrier, and the lighting unit is applied to the carrier, before the cover layer is applied onto the lighting unit and at least a portion of the carrier.

14. Method according to claim 10, wherein the lighting unit comprises at least one point-shaped light source and a planar light conductor, wherein the light conductor is applied onto the carrier and the cover layer is applied onto the light conductor and at least a portion of the carrier, before the light source is introduced into the carrier and is coupled with the light conductor.

15. Method according to claim 11, wherein the lighting unit comprises at least one point-shaped light source and a planar light conductor, wherein the light conductor is applied onto the carrier and the cover layer is applied onto the light conductor and at least a portion of the carrier, before the light source is introduced into the carrier and is coupled with the light conductor.

16. Method according to claim 15, wherein the aperture in the carrier is dimensioned to be sufficiently large so that the light source can be introduced from the C side of the carrier therein.

17. Trim means according to claim 1 which is a roof lining in a motor vehicle.

* * * * *